Dec. 1, 1931. V. J. BUTTERFIELD 1,834,141
FITTING FOR AUTOMOTIVE VEHICLE HEATERS
Filed Feb. 20, 1929   2 Sheets-Sheet 1

INVENTOR
VERNON J. BUTTERFIELD
By Paul, Paul & Moore
ATTORNEYS

Dec. 1, 1931.  V. J. BUTTERFIELD  1,834,141
FITTING FOR AUTOMOTIVE VEHICLE HEATERS
Filed Feb. 20, 1929   2 Sheets-Sheet 2

INVENTOR
VERNON J. BUTTERFIELD
By Paul, Paul & Moore
ATTORNEYS

Patented Dec. 1, 1931

1,834,141

UNITED STATES PATENT OFFICE

VERNON J. BUTTERFIELD, OF MINNEAPOLIS, MINNESOTA, ASSIGNOR TO TROPIC-AIRE, INCORPORATED, OF MINNEAPOLIS, MINNESOTA, A CORPORATION OF DELAWARE

FITTING FOR AUTOMOTIVE VEHICLE HEATERS

Application filed February 20, 1929. Serial No. 341,402.

This invention relates to a fitting more especially useful for the purpose of making operative connection between the water-circulating cooling system of a vehicle engine and an automotive vehicle heater having a heating element adapted to receive its heat from the said water-circulating cooling system.

An object of the invention is to provide a fitting of novel, improved and simple construction, useful for many purposes, but more especially adapted to the purpose of making an efficient and dependable water-tight connection between a water conduit communicating with a heating element of an automotive vehicle heater and a flexible water conduit or passage of the water-circulating cooling system of the engine of the vehicle having said heater, and which can be readily and quickly associated with the said conduit and water passage.

Other objects and advantages of the invention will appear as the specification proceeds, it being understood that the disclosure herein is merely illustrative and meant in no way in a limiting sense, various changes being permissible so long as within the scope of the claims which follow.

In the accompanying drawings forming a part of this specification,

Fig. 1 is an elevational view, partially sectioned, of a fragment of an automotive vehicle, showing the water-circulating cooling system of the vehicle engine and a heating apparatus associated therewith, and disclosing a fitting having the features of the invention making connection between a conduit in communication with the heating element of the heating apparatus and a passage of the water-circulating cooling system of the engine of the vehicle;

Figure 1:
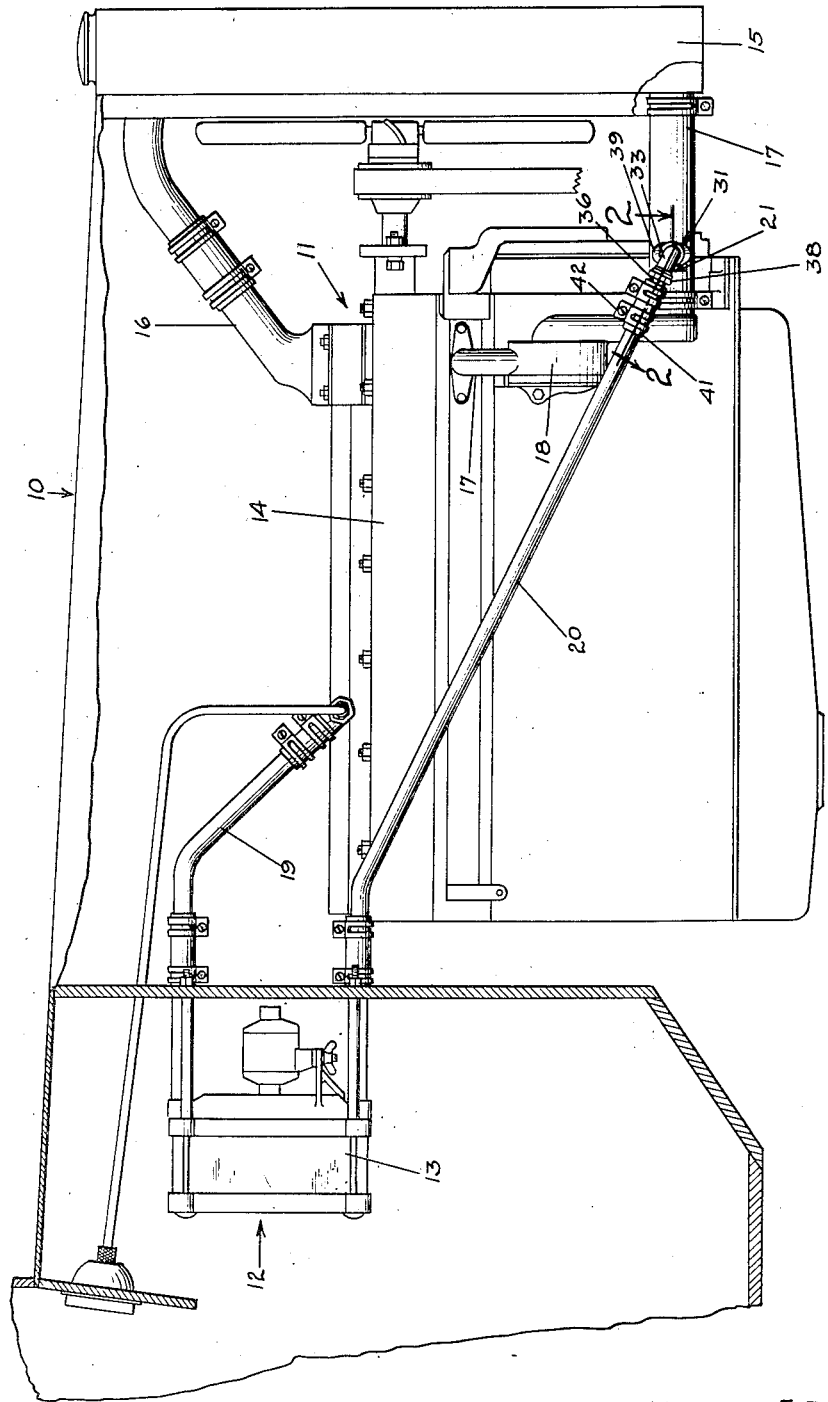
Figure 2:
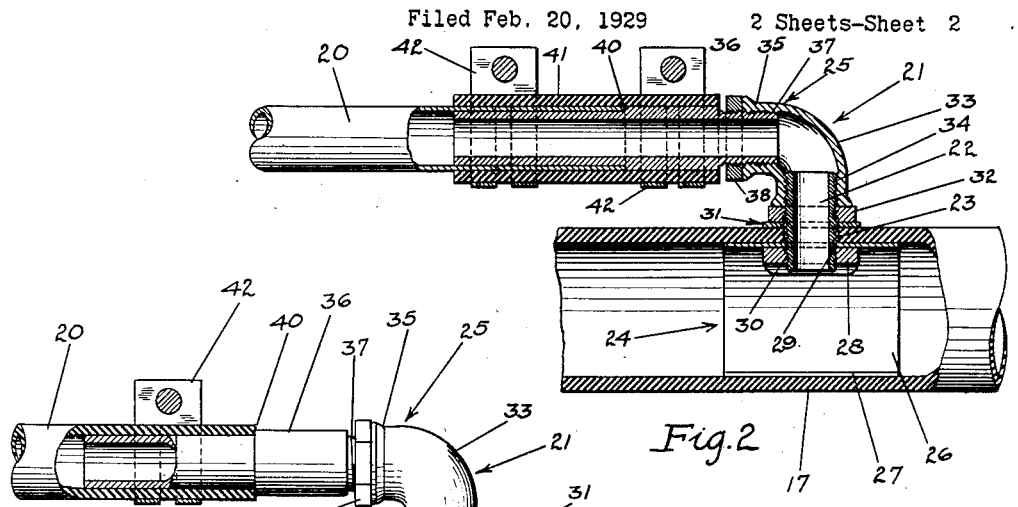
Fig. 2 is an enlarged sectional view on line 2—2 in Fig. 1, detailing the improved fitting.
Figure 3:
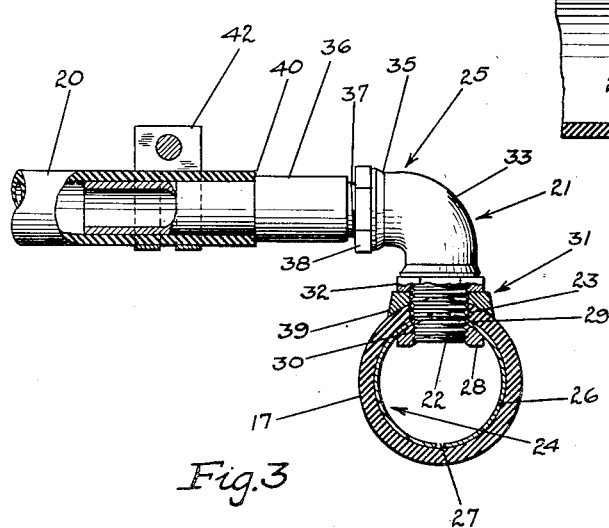
Fig. 3 is a detail sectional view of the fitting, disclosing said fitting and the conduit communicating with the heating element connected with each other in slightly modified manner.
Figure 4:
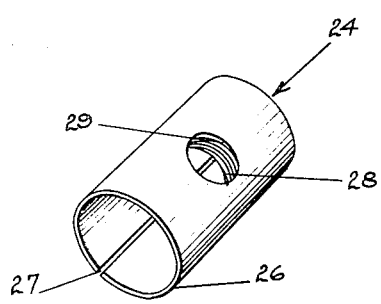
Fig. 4 is a perspective view of the nipple-receiving element of the fitting which is located within a passage of the water-circulating cooling system of the vehicle engine.
Figure 6:
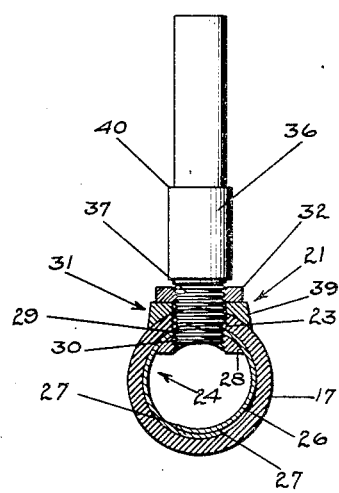
Figure 5:
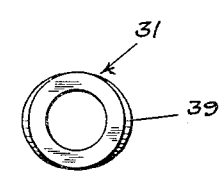
Fig. 5 is a plan view of the shaped washer of the fitting.
Figure 7:
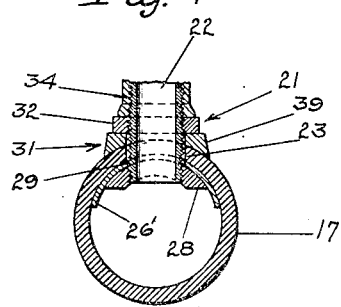

Fig. 6 is a detail sectional view disclosing the nipple-receiving element of Fig. 4 as when inserted in a passage of smaller size, and also disclosing the nipple upon the straight tube of the fitting of Figs. 2 and 3 inserted directly into said nipple-receiving element, the elbow part of the fitting of said Figs. 2 and 3 inserted directly into said nipple-receiving element, the elbow part of the fitting of said Figs. 2 and 3 being omitted; and Fig. 7 is a detail sectional view corresponding generally with the disclosures of Figs. 3 and 6, but showing a nipple-receiving element of modified construction located within the passage of the water-circulating cooling system.

With respect to the drawings and the numerals of reference thereon, 10 denotes an automotive vehicle, 11 the water-circulating cooling system of the engine thereof, and 12 a heating apparatus associated with said vehicle and engine and including a heating element 13 adapted to receive its heat from hot water of said water-circulating cooling system.

Of the water-circulating cooling system, 14 represents the engine block including a water-jacket, 15 the cooling radiator, 16 a conduit or passage leading from the water-jacket to the cooling radiator, 17 a conduit or passage leading from the cooling radiator back to the water-jacket and 18 designates the usual water pump in the conduit or passage 17. As is well known, the pump 18 operates to force cooling water through the water-circulating cooling system of the engine, the usual course of the water being from the water-jacket via the conduit or passage 16 to the cooling radiator, through the cooling radiator, and from the cooling radiator via the conduit or passage 17 back to the pump and the water-jacket.

A conduit 19 leading from the water-jacket to the heating element 13 is associated with said water-jacket in any preferred manner forming no part of the present invention, and a conduit 20 leading from said heating element to the conduit or passage 17 is associated with said conduit or passage 17 by means of a fitting 21 in which the features of the present invention reside, so that when the pump 18 is operating to force cooling water through the engine cooling system, portions of the water will also be forced through the water-circulating passages (not shown) of the heating element in a manner which will be obvious, the course of the water being from the water-jacket through the conduit 19, through the heating element, and through the conduit 20 to the conduit or passage 17.

In the drawings I have disclosed a fitting 21 consisting of a threaded nipple 22 extending through an opening 23 in the conduit or passage 17, which is, as shown, made of rubber tubing, the portion of said nipple within the tubing being associated with an internal nipple-receiving element 24, and the portion thereof without said tubing being associated with a nipple receiving unit 25, itself associated with the conduit 20.

More specifically, the nipple receiving element 24 may consist of a flexible, metallic tube 26 which snugly fits the conduit 17 and is open at one side, as indicated at 27, and a shaped nut 28 which is desirably integral with the metallic tube and is disposed internally thereof about a desirably centrally arranged opening 29 of said metallic tube. The shaped nut 28 is of cylindrical conformation at its inner and outer surfaces and snugly fits the internal surface of said metallic tube 25. The nut and tube can be made from a single piece of metal, or the one can be soldered, welded, or otherwise secured, to the other. The thread upon the inner end portion of the nipple 22 is received in the opening 29 and in the thread 30 of the nut 28.

The nipple receiving unit 25 may consist of a shaped washer 31 fitted against the outer surface of the conduit or passage 17 and having an opening receiving the outer end portion of the nipple 22, a clamping and lock nut 32 upon the said outer end portion of said nipple and adapted to be turned down against the shaped washer, an elbow 33 having an internally threaded end portion 34 screwed upon the nipple 22 and an oppositely internally threaded end portion 35, a straight tube 36 having a threaded nipple 37 adapted to be received in the threaded end portion 35 of the elbow, and a lock nut 38 upon the threaded nipple 37 and adapted to engage the adjacent end of said elbow. The shaped washer 31 is flat upon its outer surface to be engaged by the full surface of the nut 32, while at its inner surface said shaped washer is of cylindrical form, portions of the said washer, designated 39, being thicker than other portions thereof to the accomplishment of the result as stated.

The straight tube 36 may include an external shoulder 40 engaged by the conduit 20, which is as shown a metallic tube, fitted upon said straight tube, numeral 41 designating a section of rubber hose fitted upon the joint between the said straight tube and conduit, and 42 representing suitable clamps about the rubber hose to insure its position upon the joint.

In Fig. 3 the conduit 20 is of rubber and fits upon the straight tube 36 against the shoulder 40, a clamp, or clamps, 42 retaining the conduit on the fitting.

In Fig. 6 the nipple receiving element 24 is disclosed as inserted in a conduit or passage 17 having smaller internal diameter than the diameter of the open tube 26. To this end, the said tube is collapsed so that the free edges thereof overlap.

In Fig. 7 the nipple-receiving element within the passage 17 consists of a shaped nut 28 preferably secured to a flexible metal part-tube 26', disclosed as extending slightly less than one-half of the circumference of the conduit or passage 17.

It will be seen that when the nut 22 is turned down against the shaped washer 31, said washer is firmly pressed against the outer surface of the conduit or passage 17 about the opening 23 therein, while the nut 28 is drawn toward the shaped washer to cause the metal tube 26 or part-tube 26' to be firmly pressed against the inner surface of said conduit or passage about said opening, to thus provide a water-tight seal.

A special function of the metal tube 26 or part-tube 26' is to strengthen or reinforce the rubber tubing or passage 17 at the location of the fitting, so that the assembly of the fitting with the rubber tubing, to seal the opening 23, will be constituted by substantial or rigid construction rather than by the more or less loose or sloppy construction which would exist were not the strengthening or reinforcing member 26, or 26', utilized.

The nut 32 serves a double purpose, namely, to clamp the shaped washer 31 and the element 24 against the outer and the inner surfaces, respectively, of the rubber tubing 17, and to lock the elbow 33 and its associated parts in fixed relation to the said rubber tubing. As shown in Figs. 2 and 3, the said elbow and the parts carried thereby, can be turned to assume any desired angle, to conform to the relation in some particular case of the conduit 20 to the conduit or passage 17, and can be locked in desired position by being caused to firmly engage the nut 32, as will be obvious.

The outer circumferences of the conduit 20 and the straight tube 36 comprise a single, continuous circumference when said conduit is in engagement with the shoulder 40, as in Fig. 2, so that the rubber hose 41 can snugly fit the joint. The conduit 20 and the straight tube 36 can be slid relatively to each other to disengage the conduit from the shoulder 40 without destroying the water-seal, as when it is necessary to lengthen the connection between the heating element and the conduit or passage 17. By reason of the fact that the conduit 20 and the straight tube 36 are arranged in telescoping relation, the joint between the conduit 20 and the fitting is rigid, as well as is the joint between the conduit or passage 17 and said fitting.

I claim as my invention:

1. A fitting for connecting a conduit with a flexible conduit, comprising a threaded nipple-receiving strengthening element engaging a considerable area of the internal surface of said flexible conduit, a hollow nipple threaded into said element and extending outwardly through an opening in said flexible conduit, said hollow nipple being adapted to open to said conduit, a washer freely arranged upon said nipple without said flexible conduit, and a nut upon said nipple adapted to be turned down against said washer to clamp said nipple-receiving strengthening element and said washer against the inner and outer surfaces, respectively, of said flexible conduit to seal the opening therein.

2. A fitting for connecting a conduit with a flexible conduit, comprising a threaded flexible metallic member of tubular conformation engaging a considerable area of the internal surface of said flexible conduit, a hollow nipple threaded into said member of tubular conformation and extending outwardly through an opening in said flexible conduit, said hollow nipple being adapted to open to said conduit, a washer freely arranged upon said nipple without said flexible conduit, and a nut upon said nipple adapted to be turned down against said washer to clamp said member of tubular conformation and said washer against the inner and outer surfaces, respectively, of said flexible conduit to seal the opening therein.

3. A fitting for connecting a conduit with a flexible conduit, comprising a flexible metallic member of tubular conformation engaging a considerable area of the internal surface of said flexible conduit, a nut integral with said member of tubular conformation and arranged internally thereof, a hollow nipple threaded into said nut and extending outwardly through an opening in said flexible conduit, said hollow nipple being adapted to open to said conduit, a washer freely arranged upon said nipple without said flexible conduit, and a nut upon said nipple adapted to be turned down against said washer to clamp said member of tubular conformation and said washer against the inner and outer surfaces, respectively, of said flexible conduit to seal the opening therein.

4. A fitting for connecting a conduit with a flexible conduit, comprising a flexible metallic member of tubular conformation open at one side and engaging a considerable area of the internal surface of said flexible conduit, a nut integral with said member of tubular conformation and arranged internally thereof, a hollow nipple threaded into said unit and extending outwardly through an opening in said flexible conduit, said hollow nipple being adapted to open to said conduit, a shaped washer freely arranged upon said nipple without said flexible conduit and having an outer flat surface and an inner surface of cylindrical conformation adapted to engage the outer surface of said flexible conduit, and a nut upon said nipple adapted to be turned down against the flat surface of said washer to clamp said member of tubular conformation and the surface of cylindrical conformation of said washer against the inner and outer surfaces, respectively, of said flexible conduit to seal the opening therein.

5. A fitting for connecting a conduit with a flexible conduit, comprising a nipple-receiving element engaging the internal surface of said flexible conduit, a hollow nipple threaded into said element and extending outwardly through an opening in said flexible conduit, said hollow nipple being adapted to open to said conduit, a shaped washer freely arranged upon said nipple without said flexible conduit and having an outer flat surface and an inner surface of conformation to fit the outer surface of said flexible conduit, and a nut upon said nipple adapted to be turned down against the flat surface of said washer to clamp said nipple-receiving element and the inner surface of said washer against the inner and outer surfaces, respectively, of said flexible conduit to seal the opening therein.

6. A fitting for connecting a conduit with a flexible conduit, comprising a nipple-receiving element engaging the internal surface of said flexible conduit, a hollow nipple threaded into said element and extending outwardly through an opening in said flexible conduit, a washer freely arranged upon said nipple without said flexible conduit, a nut upon said nipple adapted to be turned down against said washer to clamp said nipple-receiving element and said washer against the inner and outer surfaces, respectively, of said flexible conduit to seal the opening therein, and a member having angular configuration screwed upon said nipple to engage said nut, said angular member being adapted to open to said conduit.

In witness whereof I have hereunto set my hand this 13th day of February, 1929.

VERNON J. BUTTERFIELD.